(12) United States Patent
Shibuya et al.

(10) Patent No.: US 8,354,163 B2
(45) Date of Patent: Jan. 15, 2013

(54) RESIN SUBSTRATE PROVIDED WITH COATING LAYER

(75) Inventors: Takashi Shibuya, Chiyoda-ku (JP); Kyoko Yamamoto, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 215 days.

(21) Appl. No.: 12/713,851

(22) Filed: Feb. 26, 2010

(65) Prior Publication Data
US 2010/0227161 A1 Sep. 9, 2010

(30) Foreign Application Priority Data
Mar. 3, 2009 (JP) ................................. 2009-049862

(51) Int. Cl.
*B32B 27/32* (2006.01)
*B32B 9/04* (2006.01)
*B32B 27/00* (2006.01)
*G11B 11/105* (2006.01)

(52) U.S. Cl. ..................... 428/220; 428/332; 428/411.1; 428/500

(58) Field of Classification Search .................. None
See application file for complete search history.

(56) References Cited

U.S. PATENT DOCUMENTS

| 4,396,644 | A | 8/1983 | Taniyama et al. |
| 4,668,588 | A | 5/1987 | Kishima |

FOREIGN PATENT DOCUMENTS

| EP | 1 085 136 A1 | 3/2001 |
| EP | 1 408 082 A2 | 4/2004 |
| EP | 1 408 082 A3 | 4/2004 |
| JP | 44-29756 | 12/1969 |
| JP | 8-72208 | 3/1996 |
| JP | 11-320768 | 11/1999 |
| JP | 2969103 | 11/1999 |
| JP | 2000-177070 | 6/2000 |
| JP | 2000-296579 | 10/2000 |
| JP | 2002-370324 | 12/2002 |
| JP | 2003-128730 | 5/2003 |
| JP | 2005-28795 | 2/2005 |
| JP | 2005-179504 | 7/2005 |

OTHER PUBLICATIONS

Extended European Search Report issue Sep. 8, 2010 in European Patent Application No. 10002136.9-2102.
U.S. Appl. No. 13/541,874, filed Jul. 5, 2012, Yamamoto, et al.
U.S. Appl. No. 13/531,903, filed Jun. 25, 2012, Yamamoto, et al.
Office Action issued Sep. 11, 2012, in Japanese Patent Application No. 2009-049862 (w/English translation).

*Primary Examiner* — Sheeba Ahmed
(74) *Attorney, Agent, or Firm* — Oblon, Spivak, McClelland, Maier & Neustadt, L.L.P.

(57) ABSTRACT

To provide a resin substrate provided with a coating layer having excellent weather resistance and thereby capable of maintaining properties of the resin such as transparency and fracture resistance over a long period of time.

A resin substrate provided with a coating layer, which comprises a substrate made of a resin containing an aromatic ring and a coating layer containing an acrylic polymer having an acid value of at most 1 mg KOH/g, a glass transition point of from 60° C. to 150° C. and a mass average molecular weight of from 90,000 to 1,000,000, and an ultraviolet light absorbing component selected from a polymer having ultraviolet light absorbing groups and an ultraviolet light absorber, having an average of absorption coefficients of from 3.5 g/(mg·cm) to 100 g/(mg·cm) to light in a wavelength region of from 350 nm to 380 nm, formed on at least one surface of the substrate.

5 Claims, 1 Drawing Sheet

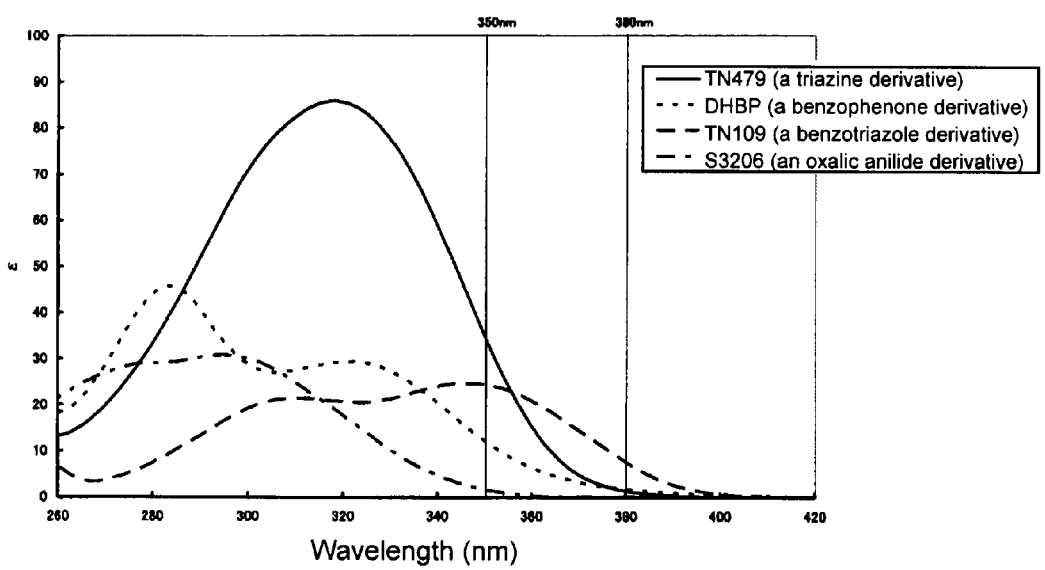

RESIN SUBSTRATE PROVIDED WITH COATING LAYER

The present invention relates to a resin substrate provided with a coating layer having weather resistance.

In recent years, as a window glass for a vehicle such as an automobile and a window glass for a building material to be attached to a building construction such as a house or a building, demands for a transparent resin plate are increasing instead of a conventional inorganic glass plate. Particularly, for a vehicle such as an automobile, for weight saving, use of a transparent resin plate as a window material has been proposed, and especially, an aromatic polycarbonate transparent resin plate is excellent in fracture resistance, transparency, light weight properties, easy processability, etc., and its use has been studied as a promising window material for a vehicle. However, such a transparent resin plate has a problem in view of the weather resistance since when used instead of a glass plate, it tends to be deteriorated by ultraviolet light rays and undergo discoloration. Accordingly, for the purpose of improving the weather resistance of the transparent resin plate, formation of a coating layer on the surface of the transparent resin plate by use of a coating agent has been proposed.

As an example of such a proposal, Patent Document 1 discloses a technique to form a transparent thermoplastic coating layer containing an ultraviolet light absorber on a polycarbonate resin substrate to prevent discoloration of the polycarbonate resin substrate by ultraviolet light rays. Further, Patent Document 2 proposes a technique of a three-layered plastic sheet comprising a polycarbonate sheet containing an ultraviolet light absorber in a predetermined ratio and a polycarbonate composition layer and an acrylate composition layer each containing an ultraviolet light absorber in each ratio, laminated on the polycarbonate sheet. However, if the ultraviolet light absorber to be used for the substrate provided with a coating layer or the laminate disclosed in Patent Document 1 or 2 is used, it is necessary to add a large amount of such an ultraviolet light absorber so as to obtain sufficient ultraviolet light absorbing performance, whereby the cost tends to be high, or moldability tends to be decreased. Further, since the compatibility between the ultraviolet light absorber and the resin forming the coating layer is insufficient, the ultraviolet light absorber tends to bleed out from the surface of a molded product with time.

Accordingly, Patent Document 3 proposes a weather resistant resin laminate having a coating layer containing a special benzotriazole compound as an ultraviolet light absorber. However, even when such an ultraviolet light absorber is used, sufficient weather resistance is hardly imparted to a resin substrate made of e.g. a polycarbonate.

Accordingly, development of a coating layer which can impart sufficient weather resistance to a transparent resin substrate made of a polycarbonate resin or the like promising as a window material particularly a window material for a vehicle, and which can maintain excellent properties such as transparency and fracture resistance for a long period of time, has been desired.

Patent Document 1: JP-B-44-29756
Patent Document 2: JP-A-8-72208
Patent Document 3: JP-A-11-320768

The present invention has been made to solve the above problems, and it is an object of the present invention to provide a resin substrate provided with a coating layer, which has excellent weather resistance and thereby maintains properties of the resin such as transparency and fracture resistance for a long period of time.

The resin substrate provided with a coating layer of the present invention is a resin substrate provided with a coating layer, which comprises a substrate made of a resin containing an aromatic ring and a coating layer containing (1) an acrylic polymer comprising at least one member selected from an alkyl acrylate and an alkyl methacrylate as main monomer units, and (2) an ultraviolet light absorbing component comprising at least one member selected from a polymer having ultraviolet light absorbing groups and an ultraviolet light absorber, formed on at least one surface of the substrate, wherein the acrylic polymer (1) has an acid value of at most 1 mgKOH/g, a glass transition point of from 60° C. to 150° C., and a mass average molecular weight of from 90,000 to 1,000,000, and the average of absorption coefficients of the ultraviolet light absorbing component (2) to light in a wavelength region of from 350 nm to 380 nm is from 3.5 g/(mg·cm) to 100 g/(mg·cm).

Here, in the present specification, a monomer selected from an alkyl acrylate and an alkyl methacrylate will be referred to as "an alkyl (meth)acrylate". Similarly, "a (meth)acryl" such as "a (meth)acryloyloxy group" means both "an acryl" and "a methacryl".

According to the resin substrate provided with a coating layer of the present invention, since the coating layer has excellent weather resistance, the resin substrate can maintain its properties such as transparency and fracture resistance for a long period of time.

In the accompanying Drawing:

FIG. 1 is a graph illustrating absorption coefficients of three examples of an ultraviolet light absorber applicable to the resin substrate provided with a coating layer of the present invention and one example of an inappropriate ultraviolet light absorber at each wavelength.

Now, the resin substrate provided with a coating layer of the present invention will be described in detail with reference to the preferred embodiments.

<Resin Substrate>

In the resin substrate provided with a coating layer of the present invention, the resin substrate, on at least one surface of which the coating layer having characteristics of the present invention is to be formed, is a substrate made of a resin containing an aromatic ring. Such a resin containing an aromatic ring may, for example, be specifically a conventional resin containing an aromatic ring such as a polycarbonate resin containing an aromatic ring, a polyester resin containing an aromatic ring such as polyethylene terephthalate, a polystyrene resin, a polycondensed product of halogenated bisphenol A and ethylene glycol, or a halogenated aryl group-containing acrylic resin. Among them, in the present invention, a polycarbonate resin of which deterioration by ultraviolet light rays is remarkable is suitably used.

The resin substrate may be made of a blended resin containing such a resin or may be a laminated substrate having two or more layers laminated by using such a resin. Further, the shape of the resin substrate is not particularly limited, and it may be flat or may be curved. Further, the thickness of the resin substrate is also not particularly limited and is properly set considering the type of the resin, the mechanical strength, the purpose of use of the resin substrate provided with a coating layer, etc. Further, the color tone of the resin substrate is preferably clear and colorless or transparent and colored.

<Coating Layer>

The coating layer of the resin substrate provided with a coating layer of the present invention contains the following (1) acrylic polymer and (2) ultraviolet light absorbing component comprising at least one member selected from a polymer having ultraviolet light absorbing groups and an ultraviolet light absorber.

(1) Acrylic Polymer

In the resin substrate provided with a coating layer of the present invention, the acrylic polymer (1) contained in the coating layer is an acrylic polymer having an acid value of at most 1 mgKOH/g, a glass transition point of from 60° C. to 150° C., and a mass average molecular weight of from 90,000 to 1,000,000. Even when the after-mentioned polymer having ultraviolet light absorbing groups is a polymer containing monomer units of an alkyl (meth)acrylate, a polymer having ultraviolet light absorbing groups is regarded as a polymer other than the acrylic polymer in the present invention.

The acid value of the acrylic polymer used in the present invention is at most 1 mgKOH/g, and if the acid value exceeds 1 mgKOH/g, cracking or the like tends to occur on a coating layer to be obtained, and such is problematic in view of the outer appearance. The acid value of the acrylic polymer is preferably at most 0.8 mgKOH/g, more preferably 0 mgKOH/g. The acid value is mg of potassium hydroxide required to neutralize a resin acid or the like in 1 g of a sample, and is a value measured in accordance with the measuring method of JIS K0070.

The glass transition point (hereinafter referred to as "Tg" as the case requires) of the acrylic polymer used in the present invention is from 60° C. to 150° C. If the glass transition point is less than 60° C., surface roughening or the like tends to occur on a coating layer to be obtained, and if it exceeds 150° C., smoothness of a coating layer to be obtained tends to be insufficient, and both are problematic in view of the outer appearance. The glass transition point (Tg) of the acrylic polymer is preferably from 70° C. to 120° C., more preferably from 90° C. to 110° C.

The acrylic polymer to be used in the present invention is an acrylic polymer having an acid value and a glass transition point within the above ranges, and having a mass average molecular weight of from 90,000 to 1,000,000. If the mass average molecular weight is smaller than 90,000, white turbidity or the like tends to occur on a coating layer to be obtained, and such is problematic in view of the outer appearance. Further, if the mass average molecular weight is higher than 1,000,000, the viscosity of a coating layer composition (solution) used at the time of forming a coating layer tends to be high, and application of the coating layer composition on the resin substrate tends to be difficult. The mass average molecular weight of the acrylic polymer is preferably from 90,000 to 800,000. The mass average molecular weight is a value measured by gel permeation chromatography using polystyrene as a standard substance. Hereinafter the mass average molecular weight described in the present specification is a value measured by the above measuring method.

The acrylic polymer used in the present invention includes a homopolymer or a copolymer which is obtained by polymerizing one or more members selected from various alkyl (meth)acrylates as the main monomer units and has the above properties. Here, the acrylic polymer having one or more members selected from alkyl (meth)acrylates "as the main monomer units" means that the total monomer units of one or more members selected from alkyl (meth)acrylates is from 90 to 100 mol % to the total monomer units constituting the acrylic polymer, and the above ratio is preferably from 95 to 100 mol %. Hereinafter in the present specification, "as the main monomer units" means the above meaning.

The number of carbon atoms in the alkyl group of the alkyl (meth)acrylate is preferably at most 6, more preferably at most 4. The alkyl (meth)acrylate may, specifically, be methyl (meth)acrylate, ethyl (meth)acrylate, isopropyl (meth)acrylate, n-butyl (meth)acrylate, isobutyl (meth)acrylate, tert-butyl (meth)acrylate or n-hexyl (meth)acrylate. The alkyl (meth)acrylate having an alkyl group having at least 7 carbon atoms may be 2-ethylhexyl (meth)acrylate, isononyl (meth)acrylate or lauryl (meth)acrylate.

The acrylic polymer used in the present invention is preferably a homopolymer having at least one member selected from alkyl (meth)acrylates having an alkyl group having at most 6 carbon atoms as the main monomer units or a copolymer of such monomers. Further, a copolymer of at least one alkyl (meth)acrylate having an alkyl group having at most 6 carbon atoms and at least one other (meth)acrylate is also preferred. The above other (meth)acrylate may, for example, be an alkyl (meth)acrylate having an alkyl group having at least 7 carbon atoms or a cycloalkyl (meth)acrylate. Further, a copolymer obtained by copolymerizing an alkyl (meth)acrylate with a (meth)acrylate having a small amount of functional groups (such as a hydroxyalkyl (meth)acrylate) may also be used. If a monomer having an acidic group such as (meth)acrylic acid is copolymerized, the resulting acrylic polymer tends to have a high acid value, however, a copolymer having a small amount of a monomer having an acidic group copolymerized may also be used so long as the acid value is within the above range.

The cycloalkyl (meth)acrylate may be cyclohexyl (meth)acrylate, 4-methylcyclohexyl (meth)acrylate, 4-t-butylcyclohexyl (meth)acrylate, isobornyl (meth)acrylate, dicyclopentanyl (meth)acrylate or dicyclopentenyloxy (meth)acrylate.

Among them, the acrylic polymer used in the present invention is preferably a polymer obtained by polymerizing one or more members selected from alkyl methacrylates as the main monomer units. Further, it is preferably a homopolymer or copolymer obtained by polymerizing one or more alkyl methacrylates having an alkyl group having at most 6 carbon atoms selected from methyl methacrylate (hereinafter referred to as "MMA" as the case requires), n-butyl methacrylate, tert-butyl methacrylate, ethyl methacrylate and isobutyl methacrylate, more preferably a homopolymer or e.g. MMA, tert-butyl methacrylate or ethyl methacrylate, or a copolymer of MMA with one or more members selected from n-butyl methacrylate, ethyl methacrylate and isobutyl methacrylate.

In the present invention, acrylic polymers having an acid value, a glass transition point and a mass average molecular weight within the above ranges may be used alone or as a mixture of two or more of them.

Such an acrylic polymer having an acid value of at most 1 mgKOH/g, a glass transition point of from 60° C. to 150° C. and a mass average molecular weight of from 90,000 to 1,000,000 used in the present invention may be prepared by using the above-described alkyl (meth)acrylate as the starting material monomer and as the case requires, together with a monomer other than the above exemplified alkyl (meth)acrylate, a molecular weight modifier, a polymerization initiator, a suspension stabilizer, an emulsifier, etc. in an amount of less than 10 mol % to the total amount of the starting material monomer, by a conventional method of polymerizing an alkyl (meth)acrylate, for example, a polymerization method such as a solution polymerization method, a bulk polymerization method, a suspension polymerization method or an emulsion polymerization method.

Further, an acrylic polymer having an acid value, a glass transition point and a mass average molecular weight within the above ranges is commercially available, and such a commercial product may be used. The commercial product may, for example, be acrylic polymers shown in the following Table 1. In the Table, the column of acrylic polymer represents the starting material monomers and the proportion of such monomers in the raw material composition by mol %.

TABLE 1

| Trade-name | Manufacturer | Acrylic polymer | | Mass average molecular weight (Mw) | Tg (° C.) | Acid value |
| --- | --- | --- | --- | --- | --- | --- |
| | | Monomer I (mol %) | Monomer II (mol %) | | | |
| LR269 | MITSUBISHI RAYON CO., LTD. | MMA (100) | — | 100,000 | 105 | At most 1 |
| BR88 | MITSUBISHI RAYON CO., LTD. | MMA (100) | — | 430,000 | 105 | 1 |
| BR108 | MITSUBISHI RAYON CO., LTD. | MMA (90) | n-butyl methacrylate (10) | 550,000 | 90 | 0 |
| BR100 | MITSUBISHI RAYON CO., LTD. | tert-butyl methacrylate (100) | — | 120,000 | 105 | 0 |
| BR80 | MITSUBISHI RAYON CO., LTD. | MMA (100) | — | 95,000 | 105 | 0 |
| BR85 | MITSUBISHI RAYON CO., LTD. | MMA (100) | — | 280,000 | 105 | 0 |

The coating layer of the resin substrate provided with a coating layer of the present invention contains as the main component an acrylic polymer having an acid value, a glass transition point and a mass average molecular weight within the above ranges, and in addition, contains the after-mentioned ultraviolet light absorbing component (1) and other optional components. In such a coating layer, the content of the acrylic polymer having an acid value, a glass transition point and a mass average molecular weight within the above ranges (provided that in a case where the coating layer contains a polymer having ultraviolet light absorbing groups as the ultraviolet light absorbing component, the total content of the acrylic polymer and the polymer chain moiety excluding the ultraviolet light absorbing groups in the ultraviolet light absorbing group-containing polymer (the details will be described hereinafter)) is preferably from 50 to 97 mass %, more preferably from 70 to 95 mass % to the total amount of components constituting the coating layer.

If the content of the acrylic polymer (provided that in a case where the coating layer contains a polymer having ultraviolet light absorbing groups as the ultraviolet light absorbing component, the total content of the acrylic polymer and the polymer chain moiety excluding the ultraviolet light absorbing groups in the ultraviolet light absorbing group-containing polymer) is less than 50 mass % to the total amount of components constituting the coating layer, the polymer components tend to be too small, and the coating layer physical properties may be deteriorated, and if it exceeds 97 mass %, the ultraviolet light shielding performance of the coating layer may be insufficient.

In a case where the coating layer contains an ultraviolet light absorbing group-containing polymer as the ultraviolet light absorbing component, the proportion of the polymer chain moiety excluding the ultraviolet light absorbing groups in the ultraviolet light absorbing group-containing polymer to the acrylic polymer among components constituting the coating layer is preferably at most 50 mass % from the viewpoint of the film formation properties.

(2) Ultraviolet Light Absorbing Component

The ultraviolet light absorbing component (2) comprising at least one member selected from a polymer having ultraviolet light absorbing groups and an ultraviolet light absorber contained in the coating layer in the resin substrate provided with a coating layer of the present invention, has an average of absorption coefficients of from 3.5 g/(mg·cm) to 100 g/(mg·cm) to light in a wavelength region of from 350 nm to 380 nm.

In the present invention, the average of absorption coefficients in a wavelength region of from 350 to 380 nm means an average of absorption coefficients obtained at 1 nm intervals in the above wavelength region. The absorption coefficient $\epsilon$ is a value obtained from the following mathematical formula 1.

$$E = \epsilon \cdot c \cdot d = \log(lo/l)$$ Mathematical formula 1:

wherein E is the absorbance, $\epsilon$ is the absorption coefficient (g/(mg·cm)), c is the absorbing component concentration (mg/g), d is the thickness (cm) of a cell, lo is the incident light intensity and l is the transmitted light intensity.

The ultraviolet light absorbing component contained in the coating layer in the resin substrate provided with a coating layer of the present invention is a compound capable of absorbing ultraviolet light rays in a relatively long wavelength region of from 350 to 380 nm among ultraviolet light rays with an average of absorption coefficients within a range of from 3.5 g/(mg·cm) to 100 g/(mg·cm). If the average of absorption coefficients in a range of from 350 to 380 nm is small than 3.5 g/(mg·cm), a coating layer to be obtained cannot impart sufficient weather resistance to the resin substrate. Further, if it exceeds 100 g/(mg·cm), there is absorption even in the visible region, thus leading to coloring.

The ultraviolet light absorbing component used in the present invention is not particularly limited so long as it has the above absorption characteristics, and specifically, at least one ultraviolet light absorber selected from a benzophenone derivative, a triazine derivative and a benzotriazole derivative, or a polymer having as ultraviolet light absorbing groups at least one member selected from a group having a benzophenone skeleton, a group having a triazine skeleton and a group having a benzotriazole skeleton, having the above absorption characteristics, may be mentioned.

As the ultraviolet light absorber contained in the coating layer of the resin substrate provided with a coating layer of the present invention, for example, an ultraviolet light absorber obtained in such a manner that to a compound having a benzophenone skeleton, a triazine skeleton or a benzotriazole skeleton as a basic structure (skeleton), organic groups to be bonded to the skeleton are introduced by properly adjusting the type, the number, the position, etc. of the organic group so that the absorption characteristics of the obtainable compound are within a range applicable to the present invention, can be used without particular limitation.

Specific examples of such an ultraviolet light absorber used in the present invention are shown below together with the structural formula, optical characteristics and examples of a commercial product. The absorption characteristics mean an average (unit: g/(mg·cm)) of absorption coefficients obtained at 1 nm intervals within a wavelength region of from 350 to 380 nm as the absorption coefficient ε (350-380) ave. In the present specification, the term "absorption coefficient ε (350-380) ave" means the above meaning.

The ultraviolet light absorber classified in a triazine derivative, may, for example, be specifically 2-[4-(4,6-bis-biphenyl-4-yl-[1,3,5]triazin-2-yl)-3-hydroxy-phenoxy]-propionic acid 6-methyl-heptyl ester represented by the following structural formula (1) (absorption coefficient ε (350-380) ave: 12.4, commercial product: TINUVIN 479 (tradename, manufactured by Ciba Japan), etc.:

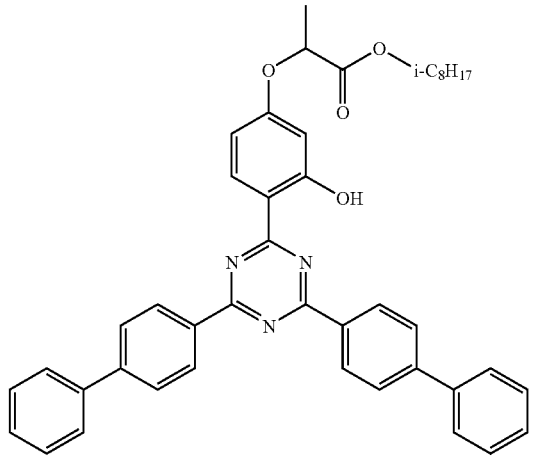
(1)

2-[4-(4,6-bis-{2-hydroxy-4-[1-(6-methyl-heptyloxycarbonyl)-ethoxy]-phenyl}-[1,3,5]triazin-2-yl)-3-hydroxy-phenoxy]-propionic acid 6-methyl-heptyl ester represented by the following structural formula (2) (absorption coefficient ε (350-380) ave: 31.0, commercial product: CGL777 (tradename, manufactured by Ciba Japan), etc.:

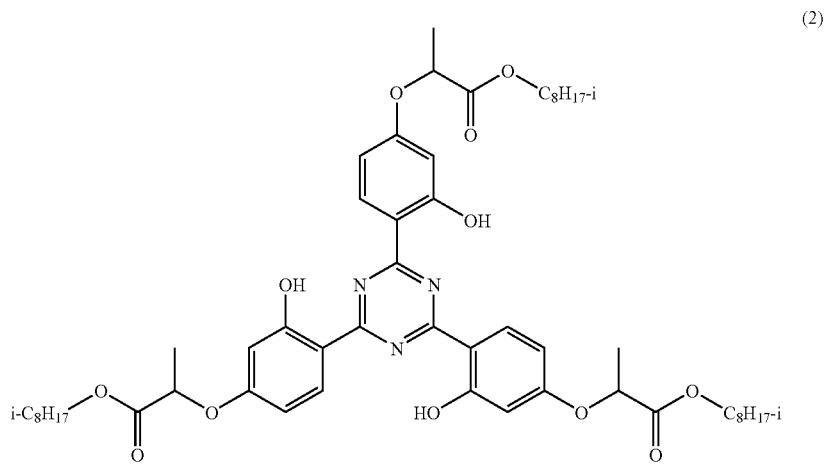
(2)

a reaction product of 2-(4,6-bis(2,4-dimethylphenyl)-1,3,5-triazin-2-yl)-5-hydroxyphenyl and oxirane represented by the following structural formula (3) (absorption coefficient ε (350-380) ave: 4.5, commercial product: TINUVIN 400 (tradename, manufactured by Ciba Japan), etc.:

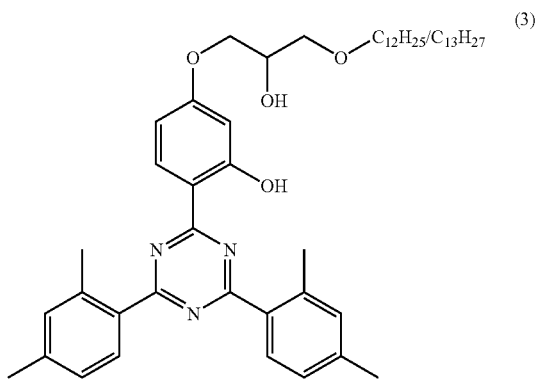

(3)

2,4-bis[2-hydroxy-4-butoxyphenyl]-6-(2,4-dibutoxyphenyl)-1,3,5-triazine represented by the following structural formula (4) (absorption coefficient ε (350-380) ave: 37.0, commercial product: TINUVIN 460 (tradename, manufactured by Ciba Japan), etc.:

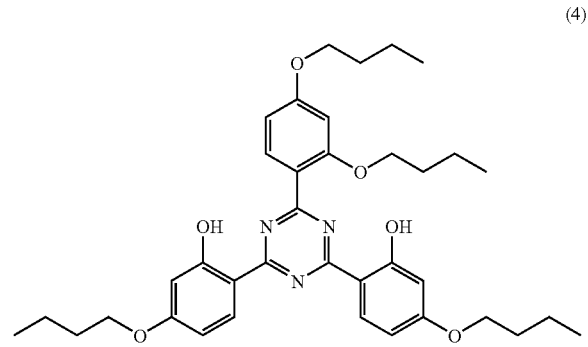 [SMILES: CCCCOc1ccc(-c2nc(-c3ccc(OCCCC)cc3O)nc(-c3ccc(OCCCC)cc3OCCCC)n2)c(O)c1]

(4)

or a reaction product of 2-(2,4-dihydroxyphenyl)-4,6-bis(2,4-dimethylphenyl)-1,3,5-triazine and (2-ethylhexyl)-glycidic acid ester represented by the following structural formula (5) (absorption coefficient ε (350-380) ave: 6.3, commercial product: TINUVIN 405 (tradename, manufactured by Ciba Japan), etc.:

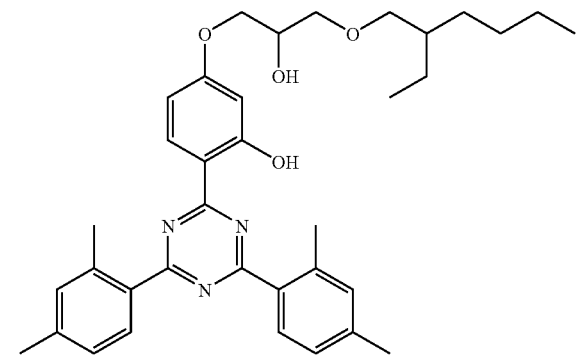

(5)

The ultraviolet light absorber classified in a benzophenone derivative may, for example, be specifically 4,6-dibenzoylresorcinol (hereinafter sometimes referred to as DBR) represented by the following structural formula (6) (absorption coefficient ε (350-380) ave: 4.1:

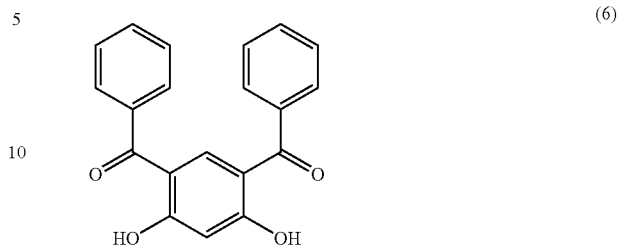

(6)

or 2,4-dihydroxybenzophenone (hereinafter sometimes referred to as DHBP) represented by the following structural formula (7) (absorption coefficient ε (350-380) ave: 5.5:

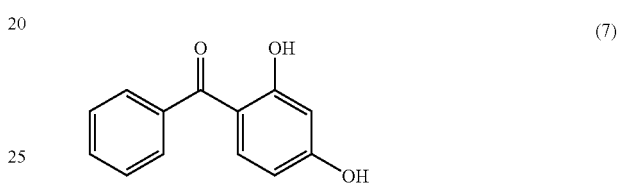

(7)

Further, the ultraviolet light absorber classified in a benzotriazole derivative may, for example, be specifically octyl-3-[3-t-butyl-4-hydroxy-5-(5-chloro-2H-benzotriazol-2-yl)phenyl]propionate represented by the following structural formula (8) (absorption coefficient ε (350-380) ave: 17.2, commercial product: TINUVIN 109 (tradename, manufactured by Ciba Japan), etc.:

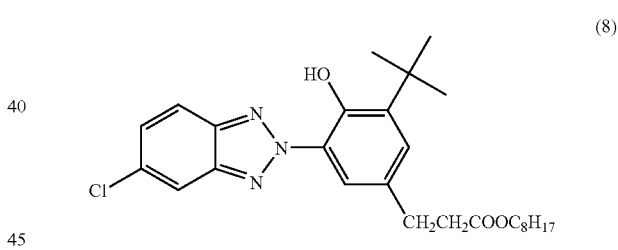

(8)

or 2-(2H-benzotriazol-2-yl)-6-(1-methyl-1-phenylethyl)-4-(1,1,3,3-tetramethylbutyl)phenol represented by the following structural formula (9) (absorption coefficient ε (350-380) ave: 16.3, commercial product: TINUVIN 928 (tradename, manufactured by Ciba Japan), etc.:

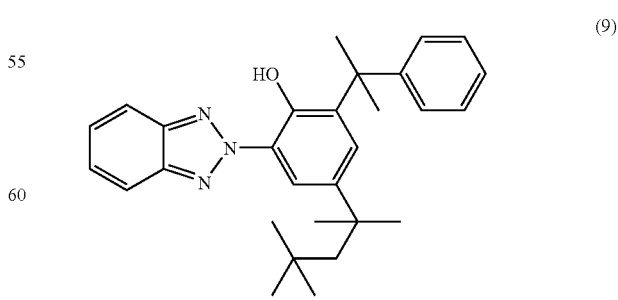

(9)

For the resin substrate provide with a coating layer of the present invention, among such ultraviolet light absorbers, preferred is 2-[4-(4,6-bis-biphenyl-4-yl-[1,3,5]triazin-2-yl)-3-hydroxy-phenoxy]-propionic acid 6-methyl-heptyl ester (commercial product: TINUVIN 479, etc.), 2-[4-(4,6-bis-{2-hydroxy-4-[1-(6-methyl-heptyloxycarbonyl)-ethoxy]-phenyl}-[1,3,5]triazin-2-yl)-3-hydroxy-phenoxy]-propionic acid 6-methyl-heptyl ester (commercial product: CGL777, etc.), 4,6-dibenzoylresorcinol, octyl-3-[3-tert-butyl-4-hydroxy-5-(5-chloro-2H-benzotriazol-2-yl)propyl]propionate (commercial product: TINUVIN 109, etc.), or 2-(2H-benzotriazol-2-yl)-6-(1-methyl-1-phenylethyl)-4-(1,1,3,3-tetramethylbutyl)phenol (commercial product: TINUVIN 928, etc.).

As an example specifically illustrating ultraviolet light absorption characteristics of an ultraviolet light absorber applicable to the resin substrate provided with a coating layer of the present invention, a graph of absorption coefficients of the following three ultraviolet light absorbers at each wavelength is shown in FIG. 1. FIG. 1 illustrates results of measurement of absorption coefficients of TINUVIN 479 (TN479) as a triazine derivative, 2,4-dihydroxybenzophenone (DHBP) as a benzophenone derivative and TINUVIN 109 (TN109) as a benzotriazole derivative as ultraviolet light absorbers applicable to the present invention. Further, as an example of an ultraviolet light absorber inappropriate to the resin substrate provided with a coating layer of the present invention, a graph of an absorption coefficient of an ultraviolet light absorber used in the after-mentioned Comparative Example, ethanediamide-N-(2-ethoxyphenyl)-N'-(4-isodecylphenyl)-(oxalic anilide) (tradename: Sanduvor 3206 (S3206), manufactured by Clariant (Japan) K.K., absorption coefficient £ (350-380) ave: 0.4) is also shown in FIG. 1.

Further, in the present invention, the polymer having ultraviolet light absorbing groups used in the same manner as the ultraviolet light absorber as the ultraviolet light absorbing component may, for example, be a polymer obtained by polymerization of an ultraviolet light absorbing group-containing monomer (hereinafter referred to as a monomer (A) as the case requires) which is a compound having an ultraviolet light absorbing group and an ethylenic double bond, or a copolymer obtained by copolymerization of an ultraviolet light absorbing group-containing monomer and a monomer (hereinafter referred to as a monomer (B) as the case requires) which is a compound having no ultraviolet light absorbing group and having an ethylenic double bond. Such a polymer having ultraviolet light absorbing groups is characterized in that the absorption coefficient in a polymer state is within the above range of the present invention, that is, the average of absorption coefficients to light in a wavelength region of from 350 nm to 380 nm is from 3.5 g/(mg·cm) to 100 g/(mg·cm).

The ultraviolet light absorbing group of the polymer having ultraviolet light absorbing groups, in other words, the ultraviolet light absorbing group of the monomer (A) as the starting material monomer, may, specifically, be at least one member selected from a group having a benzophenone skeleton, a group having a triazine skeleton and a group having a benzotriazole skeleton. The ultraviolet light absorbing group of the polymer may be one or more of them.

Further, the ethylenic double bond of the monomer (A) may, for example, be specifically an addition polymerizable unsaturated bond such as a (meth)acryloyloxy group, an allyl group, a vinyl group or a vinyl ether group, or a group having some or all of hydrogen atoms in such an addition polymerizable unsaturated group substituted by a hydrocarbon group. In the present invention, the group having an ethylenic double bond is preferably a (meth)acryloyloxy group.

As specific examples of such a monomer (A), the following compounds having a group having a benzotriazole skeleton as the ultraviolet light absorbing group may be mentioned. In the following compounds, the methacryloyloxy group may be an acryloyloxy group.

2-(2-hydroxy-5-methacryloyloxyphenyl)-2H-benzotriazole, 2-(2-hydroxy-3-tert-butyl-5-methacryloyloxymethylphenyl)-2H-benzotriazole, 2-[2-hydroxy-5-(2-methacryloyloxyethyl)phenyl]-2H-benzotriazole, 2-[2-hydroxy-3-tert-butyl-5-(2-methacryloyloxyethyl)phenyl]-5-chloro-2H-benzotriazole, and 2-[2-hydroxy-3-methyl-5-(8-methacryloyloxyethyl)phenyl]-2H-benzotriazole.

The following compounds having a group having a benzophenone skeleton as the ultraviolet light absorbing group may be mentioned. In the following compounds, the methacryloyloxy group may be an acryloyloxy group.

2-hydroxy-4-(2-methacryloyloxyethoxy)benzophenone, 2-hydroxy-4-(4-methacryloyloxybutoxy)benzophenone, 2,2'-dihydroxy-4-(2-methacryloyloxyethoxy)benzophenone, 2,4-dihydroxy-4'-(2-methacryloyloxyethoxy)benzophenone, 2,2',4-trihydroxy-4'-(2-methacryloyloxyethoxy)benzophenone, 2-hydroxy-4-(3-methacryloyloxy-2-hydroxypropoxy)benzophenone and 2-hydroxy-4-(3-methacryloyloxy-1-hydroxypropoxy)benzophenone may, for example, be mentioned.

Among them, in the present invention, preferred is 2-(2-hydroxy-5-methacryloyloxyphenyl)-2H-benzotriazole or 2,2',4-trihydroxy-4'-(2-methacryloyloxyethoxy)benzophenone.

In order to obtain the polymer having ultraviolet light absorbing groups as the ultraviolet light absorbing component used in the present invention, the ethylenic double bond of the monomer (B) which may be copolymerized with the monomer (A) may be the same as exemplified for the monomer (A). A preferred group having an ethylenic double bond in the monomer (B) is a (meth)acryloyloxy group, and as a specific example of the monomer (B), a (meth)acrylate exemplified as a monomer for production of the acrylic polymer (1) may be mentioned.

Among the ultraviolet light absorbing group-containing polymers obtainable by polymerizing at least one member selected from such monomers (A) and as the case requires, at least one member selected from the monomers (B), a polymer having absorption characteristics to ultraviolet light rays applicable to the present invention is used as an ultraviolet light absorbing component contained in the coating layer of the resin substrate provided with a coating layer of the present invention. Polymerization of the monomer (A) and the monomer (B) optionally added is carried out by a conventional method of polymerizing an addition polymerizable monomer, for example, by a polymerization method such as a solution polymerization method, a bulk polymerization method, a suspension polymerization method or an emulsion polymerization method, together with a molecular weight modifier, a polymerization initiator, a suspension stabilizer, an emulsifier, etc. added as the case requires. The polymer having ultraviolet light absorbing groups used in the present invention is preferably one having a mass average molecular weight of from about 10,000 to about 500,000, more preferably from about 20,000 to about 200,000.

The proportion of the ultraviolet light absorbing groups in the ultraviolet light absorbing group-containing polymer is preferably from 20 to 80 mass %, more preferably from 30 to 70 mass % to the entire ultraviolet light absorbing group-containing polymer. If the proportion of the ultraviolet light absorbing groups in the ultraviolet light absorbing group-containing polymer is less than 20 mass %, the ultraviolet light absorbing performance is insufficient in some cases, and if it exceeds 80 mass %, physical properties of the ultraviolet light absorbing group-containing polymer are deteriorated in some cases.

Here, the ultraviolet light absorbing group in the ultraviolet light absorbing group-containing polymer is a moiety excluding the group containing an ethylenic double bond relating to the polymerization, i.e. formation of a polymer chain, in the monomer (A). With reference to 2-(2-hydroxy-5-methacryloyloxyphenyl)-2H-benzotriazole which is a monomer (A) preferably used in the present invention as an example, the moiety excluding the methacryloyloxyphenyl group is an ultraviolet light absorbing group, and in the case of 2,2'4-trihydroxy-4'-(2-methacryloyloxyethoxy)benzophenone, the moiety excluding the methacryloyloxyethoxy group is the ultraviolet light absorbing group.

Further, in the ultraviolet light absorbing group-containing polymer used in the present invention, the polymer chain moiety is the entire moiety excluding the moiety defined as the ultraviolet light absorbing group.

As the above ultraviolet light absorbing group-containing polymer satisfying conditions of the ultraviolet light absorption characteristics applicable to the present invention, a commercial product is available, and such a product can be used for the present invention. As such a commercial product, specifically, UVA935LH (tradename, manufactured by BASF Japan Ltd., absorption coefficient ε (350-380) ave: 33.9) may, for example, be mentioned.

The coating layer of the resin substrate provided with a coating layer of the present invention contains at least one member selected from the ultraviolet light absorber and the vinyl polymer having ultraviolet light absorbing groups. In the coating layer of the resin substrate provided with a coating layer of the present invention, the content of the ultraviolet light absorbing component (2), as the total amount of the ultraviolet light absorber and the ultraviolet light absorbing groups in the polymer having ultraviolet light absorbing groups, is preferably from 1 to 30 mass %, more preferably 5 to 25 mass % to the total amount of components constituting the coating layer. If the content of the ultraviolet light absorbing component is less than 1 mass %, the weather resistance is insufficient in some cases, and if it exceeds 30 mass %, bleeding out of the ultraviolet light absorbing component occurs in some cases.

Further, the coating layer of the resin substrate in the present invention may contain, as other optional components, a photostabilizer or the like. The photostabilizer may be a hindered amine derivative or a nickel complex such as nickel bis(octylphenyl)sulfide, nickel complex-3,5-di-tert-butyl-4-hydroxybenzylphosphate monoethylate or nickel dibutyldithiocarbamate. Two or more of them may be used in combination. The content of the photostabilizer in the coating layer is properly selected within a range not to impair the effect of the present invention, and is preferably from 0.01 to 5 mass %, more preferably from 0.1 to 2 mass % to the total amount of components constituting the coating layer.

Further, the coating layer of the resin substrate provided with a coating layer of the present invention may contain additives such as a leveling agent, an antifoaming agent and a viscosity modifier used as the case requires for formation of the coating layer on the substrate, within a range not to impair the effects of the present invention.

<Preparation of Coating Layer Composition for Formation of Coating Layer, and Formation of Coating Layer>

The resin substrate provided with a coating layer of the present invention comprises the above resin substrate and a coating layer containing the acrylic polymer (1) and the ultraviolet light absorbing component (2) formed on at least one surface of the resin substrate. To obtain such a resin substrate provided with a coating layer of the present invention, a conventional coating layer formation method for formation of a coating layer containing an acrylic polymer as the main component on a resin substrate is applied. As a specific method of forming a coating layer containing an acrylic polymer as the main component on a resin substrate, a method may be mentioned wherein a coating layer composition containing coating layer constituting components is prepared, a coating layer comprising the coating layer composition is formed on a resin substrate, followed by drying as the case requires, and the acrylic polymer as the main component is heat-cured.

The coating layer composition for formation of the resin substrate provided with a coating layer of the present invention contains the acrylic polymer (1) and the ultraviolet light absorbing component (2) in the respective amounts, and contains an optional component in an appropriate amount as the case requires, and preferably further contains a solvent to uniformly apply such components. The solvent contained in such a coating layer composition is not particularly limited so long as the acrylic polymer (1) and the ultraviolet light absorbing component (2) can stably be dissolved.

The solvent which can be used in the present invention may, for example, be specifically a ketone derivative such as acetone, methyl ethyl ketone, methyl isobutyl ketone or cyclohexanone; an ether derivative such as tetrahydrofuran, 1,4-dioxane or 1,2-dimethoxyethane; an ester derivative such as ethyl acetate, n-butyl acetate or methoxyethyl acetate; an alcohol derivative such as methanol, ethanol, 1-propanol, 2-propanol, 1-butanol, 2-butanol, 2-methyl-1-propanol, 2-methoxyethanol, 4-methyl-2-pentanol, 2-butoxyethanol, 1-methoxy-2-propanol or diacetone alcohol; a hydrocarbon derivative such as n-hexane, n-heptane, isooctane, benzene, toluene, xylene, gasoline, light oil or kerosene; acetonitrile, nitromethane or water. They may be used alone or in combination of two or more of them.

In the present invention, the solvent is preferably at least one member selected from n-butyl acetate, 1-methoxy-2-propanol and diacetone alcohol.

Further, the amount of the solvent used is preferably from 1 to 50 times, particularly preferably from 1 to 20 times by mass to the amount of the acrylic polymer (provided that in a case where the coating layer contains the polymer having ultraviolet light absorbing groups as the ultraviolet light absorbing component, the total amount of the acrylic polymer and the polymer chain moiety excluding the ultraviolet light absorbing groups of the ultraviolet light absorbing group-containing polymer). The content of the solid content in the coating layer composition is preferably from 1 to 50 mass %, particularly preferably from 3 to 30 mass %.

The above respective components are well mixed to obtain a uniform coating layer composition, which is applied on a resin substrate. The coating method is not particularly limited, and it may, for example, be spray coating, dip coating or flow coating. A coating layer comprising the coating layer composition is formed on the resin substrate in such a manner, followed by drying as the case requires, and then the solvent is removed by heating to form a coating layer. The heating conditions are not particularly limited, but heating is preferably carried out at from 50 to 140° C. for from 5 minutes to 3 hours.

The coating layer thus formed preferably has a thickness of at least 0.5 μm and at most 10 μm, particularly preferably at least 3 μm and at most 8 μm. If the thickness of the coating layer is less than 0.5 μm, the weather resistance is insufficient in some cases, and if it exceeds 10 μm, drawbacks such as warpage of the substrate may occur.

The resin substrate provided with a coating layer of the present invention can be used as it is for various applications as a weather resistant resin substrate. Further, it is possible to provide a hard coat layer on the coating layer. As the hard coat layer, a conventional hard coat layer may be used without particular limitation.

The material of such a hard coat layer is not particularly limited, and preferred is a silicone hard coat layer in view of the weather resistance and the abrasion resistance, or an ultraviolet light-cured acrylic hard coat layer in view of the productivity. The silicone hard coat layer can be formed, for example, in such a manner that a curable silicone hard coat material containing a hydrolyzate having a part of or the entire hydrolyzable silane compound hydrolyzed, a hydrolyzed condensate having the hydrolyzate condensed and a solvent, and as the case requires, an additive, is applied on the coating layer of the resin substrate provided with a coating layer of the present invention to form a coating layer, and the curable compound in the coating layer is cured. The ultraviolet light-cured acrylic hard coat layer can be formed, for example, in such a manner that an ultraviolet light-curable acrylic hard coat material containing a compound having an ethylenic double bond such as a (meth)acryloyl group and a solvent and as the case requires, an additive, is applied on the coating layer of the resin substrate provided with a coating layer of the present invention to form a coating layer, and the polymerizable compound in the coating layer is cured by ultraviolet light rays. The method of applying the hard coat material is not particularly limited, and it may, for example, be spray coating, dip coating, flow coating or spin coating.

The resin substrate provided with a coating layer, coated with the silicone hard coat material, is usually dried under a temperature condition of room temperature or above and lower than the heat deformation temperature of the resin substrate to remove the solvent, and then heat cured. Such heat curing reaction is preferably carried out at high temperature within a range of the heat resistance of the resin substrate, whereby curing can be completed more quickly. The resin substrate provided with a coating layer, coated with the ultraviolet light curable acrylic hard coat material is usually dried under a temperature condition of room temperature or above and lower than the heat deformation temperature of the resin substrate to remove the solvent, and cured by ultraviolet light rays.

In the resin substrate provided with a coating layer of the present invention, the coating layer itself has ultraviolet light shielding performance and thereby has high weather resistance, and accordingly deterioration of the resin substrate beneath the coating layer by ultraviolet light rays can be suppressed. That is, the resin substrate is protected by a coating layer having high weather resistance, and it can maintain its excellent properties such as transparency and fracture resistance over a long period of time. Further, the coating layer of the resin substrate provided with a coating layer of the present invention is thin and is easily recyclable as compared with a conventional weather resistant laminate by lamination. The resin substrate provided with a coating layer of the present invention having such properties can be used as a window glass for a vehicle to be attached to an automobile or transportation, or a window glass for a building material to be attached to a building construction such as a house or a building.

Now, the present invention will be described in further detail with reference to Examples. However, it should be understood that the present invention is by no means restricted to such specific Examples.

First, starting materials used in Examples and Comparative Examples will be described.

(1) Acrylic Polymer

Types, abbreviations and physical properties of acrylic polymers used in Examples and Comparative Examples are shown in Table 2. As shown in Table 2, acrylic polymers AP-1 to AP-4 are acrylic polymers having a mass average molecular weight, a glass transition temperature and an acid value within ranges of the present invention and are applicable as Examples. On the other hand, acrylic polymers AP-5 to AP-10 are acrylic polymer for Comparative Examples, having at least one of the mass average molecular weight, the glass transition temperature and the acid value out of the ranges of the present invention. In Examples and Comparative Examples, acrylic polymers are represented by abbreviations AP-1 to AP-10.

TABLE 2

| Acrylic polymer abbreviation | Type of acrylic polymer | Mass average molecular weight (Mw) | Tg (° C.) | Acid value |
|---|---|---|---|---|
| AP-1 | PMMA | 100,00 | 105 | At most 1 |
| AP-2 | PMMA | 430,000 | 105 | 1 |
| AP-3 | Copolymer of methyl methacrylate and n-butyl methacrylate (9:1) | 550,000 | 90 | 0 |
| AP-4 | Homopolymer of tert-butyl methacrylate | 120,000 | 105 | 0 |
| AP-5 | PMMA | 87,000 | 105 | At most 1 |
| AP-6 | PMMA | 40,000 | 105 | 2 |
| AP-7 | PMMA | 250,000 | 105 | 10.5 |
| AP-8 | PMMA | 85,000 | 100 | 3 |
| AP-9 | PMMA | 85,000 | 90 | 0 |
| AP-10 | Homopolymer of isobutyl methacrylate | 160,000 | 50 | 0 |

(2) Ultraviolet Light Absorbing Component (Ultraviolet Light Absorber)

Types, abbreviations and absorption characteristics of ultraviolet light absorbers used in Examples and Comparative Examples are shown in Table 3. As shown in Table 3, ultraviolet light absorbers UVA1 to UVA6 are ultraviolet light absorbers having absorption characteristics within a range of the present invention and applicable as Examples. On the other hand, ultraviolet light absorbers UVA7 to UVA10 are ultraviolet light absorbers for Comparative Examples having absorption characteristics out of the range of the present invention. Further, structural formulae of the ultraviolet light absorbers UVA7 to UVA10 are shown. In the following Examples and Comparative Examples, ultraviolet light absorbers are presented by abbreviations UVA1 to UVA10.

TABLE 3

| Abbreviation | Compound | Tradename, etc. | Chemical structural formula | Classification | Absorption coefficient ε (350-380) ave |
|---|---|---|---|---|---|
| UVA1 | 2-[4-(4,6-bis-biphenyl-4-yl-[1,3,5]triazin-2-yl)-3-hydroxy-phenoxy]-propionic acid 6-methyl-heptyl ester | TINUVIN 479 | (1) | Triazine derivative | 12.4 |
| UVA2 | 2-[4-(4,6-bis-{2-hydroxy-4-[1-(6-methyl-heptyloxycarbonyl)-ethoxy]-phenyl}-[1,3,5]triazin-2-yl)-3-hydroxy-phenoxy]-propionic acid 6-methyl-heptyl ester | CGL777 | (2) | Triazine derivative | 31.0 |
| UVA3 | 4,6-dibenzoylresorcinol | DBR | (6) | Benzophenone derivative | 4.1 |
| UVA4 | Octyl-3-[3-tert-butyl-4-hydroxy-5-(5-chloro-2H-benzotriazol-2-yl)propyl]propionate | TINUVIN 109 | (8) | Benzotriazole derivative | 17.2 |
| UVA5 | 2,4-dihydroxybenzophenone | DHBP | (7) | Benzophenone derivative | 5.5 |
| UVA6 | 2-(2H-benzotriazol-2-yl)-6-(1-methyl-1-phenylethyl)-4-(1,1,3,3-tetramethylbutyl)phenol | TINUVIN 928 | (9) | Benzotriazole derivative | 16.3 |
| UVA7 | 2-hydroxy-4-n-octyloxybenzophenone | HOBP | (10) | | 3.2 |
| UVA8 | [(4-methoxyphenyl)-methylene]-dimethyl malonate | Hostavin PR25 (manufactured by Clariant (Japan) K.K.) | (1) | | 0.7 |
| UVA9 | 2-ethylhexyl-2-cyano-3,3-diphenyl acrylate | Uvinul3039 (manufactured by BASF Japan Ltd.) | (12) | | 1.3 |
| UVA10 | Ethanediamide-N-(2-ethoxyphenyl)-N'-(4-isodecylphneyl)-(oxalic anilide) | Sanduvor 3206 (manufactured by Clariant (Japan) K.K.) | (13) | | 0.4 |

<Chemical structural formula (10) of UVA7>

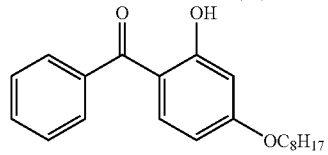

<Chemical structural formula (11) of UVA8>

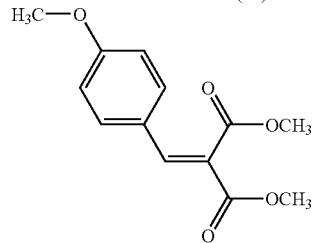

<Chemical structural formula (12) of UVA9>

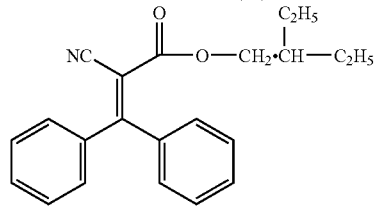

<Chemical structural formula (13) of UVA10>

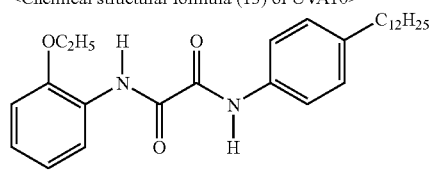

Now, a method of the weather resistance test carried out with respect to resin substrate samples provided with a coating layer obtained in Examples and Comparative Examples will be described.

[Method of Weather Resistance Test]

Using an accelerated weather meter using a metal halide lamp as a light source (DAIPLA METALWEATHER KU-R4, manufactured by DAIPLA WINTES CO., LTD.), three conditions of irradiation with light, exposure to darkness and moisture condensation were continuously loaded on resin substrate samples provided with a coating layer obtained in the following Examples and Comparative Examples. As conditions of the irradiation, light is applied for four hours with an illuminance of 90 mW/cm$^2$ at a black panel temperature of 63° C. under a relative humidity of 70%. As the conditions of the moisture condensation, the black panel temperature is naturally decreased from 70° C. to 30° C. without irradiation with light under a relative humidity of 98%, and the sample is held for 4 hours. As the conditions of the exposure to darkness, the sample is held for 4 hours without irradiation with light at a black panel temperature of 70° C. under a relative humidity of 90%.

After a lapse of 600 hours under the above loads, the outer appearance was visually observed. Further, in accordance with the method of JIS K7105, the YI value ($YI_{600}$) after the weather resistance test was obtained, and the difference ($\Delta YI=YI_{600}-YI_0$) between $YI_{600}$ and the YI value ($YI_0$) before the weather resistance test was calculated. As the overall judgement, the outer appearance and $\Delta YI$ were evaluated based on the following standards, and a sample which passed both was regarded as passed (◯) and a sample which failed either one of the outer appearance and $\Delta YI$ was is regarded as failed (x) as the overall judgement.

Outer appearance: cracking, separation, white turbidity or the like of a coating layer were visually evaluated, and a coating layer without any drawbacks is regarded as passed (ok). A sample on which cracking, separation, white turbidity or the like is confirmed is regarded as failed, and the content of the drawbacks is described in the column of results.

$\Delta YI$: a sample with $\Delta YI$ of 5 or smaller is regarded as passed, and a sample with $\Delta YI$ larger than 5 is regarded as failed (with respect to the evaluation by $\Delta YI$, when $\Delta YI$ is 5 or smaller, a practically sufficient performance is achieved).

EXAMPLE 1

A polymer solution 1 (a solution having 30 mass % of acrylic polymer (AP-1), 42 mass % of xylene, 7 mass % of 2-butanol and 21 mass % of methyl isobutyl ketone mixed) (60 g), UVA1 (1.8 g), n-butyl acetate (15 g) and 2-propanol (3 g) were uniformly mixed to prepare a coating fluid 1. The coating fluid 1 was applied on a polycarbonate sheet (CARBOGLASS (registered trademark) Polish Clear (tradename, manufactured by Asahi Glass Company, Limited), thickness: 3 mm) by dip coating, dried at room temperature for 10 minutes and dried in an oven at 120° C. for 30 minutes to obtain a sample 1. The thickness after drying was 4.8 μm. The sample 1 was subjected to the above weather resistance test, whereupon there was no drawback in the outer appearance, and $\Delta YI$ was 0.3, and accordingly the sample 1 was judged as passed.

EXAMPLE 2

The polymer solution 1 (60 g), UVA2 (1.8 g), 1-methoxy-2-propanol (15 g) and 2-butanol (15 g) were uniformly mixed to prepare a coating fluid 2. A sample 2 was obtained in the same manner as in Example 1 by using the coating fluid 2. The thickness after drying was 5.4 μm. The sample 2 was subjected to the above weather resistance test, whereupon there was no drawback in the outer appearance, and $\Delta YI$ was 2.0, and accordingly the sample 2 was judged as passed.

EXAMPLE 3

The polymer solution 1 (60 g), UVA3 (1.8 g), 1-methoxy-2-propanol (15 g) and 2-butanol (15 g) were uniformly mixed to prepare a coating fluid 3. A sample 3 was obtained in the same manner as in Example 1 by using the coating fluid 3. The thickness after drying was 5.7 μm. The sample 3 was subjected to the above weather resistance test, whereupon there was no drawback in the outer appearance, and $\Delta YI$ was 0.9, and accordingly the sample 3 was judged as passed.

EXAMPLE 4

The polymer solution 1 (60 g), UVA4 (1.8 g), 1-methoxy-2-propanol (15 g) and 2-butanol (15 g) were uniformly mixed to prepare a coating fluid 4. A sample 4 was obtained in the same manner as in Example 1 by using the coating fluid 4. The thickness after drying was 5.3 μm. The sample 4 was subjected to the above weather resistance test, whereupon there was no drawback in the outer appearance, and $\Delta YI$ was 3.2, and accordingly the sample 4 was judged as passed.

EXAMPLE 5

The polymer solution 1 (60 g), UVA5 (2.7 g), n-butyl acetate (15 g) and 2-propanol (30 g) were uniformly mixed to prepare a coating fluid 5. A sample 5 was obtained in the same manner as in Example 1 by using the coating fluid 5. The thickness after drying was 5.7 μm. The sample 5 was subjected to the above weather resistance test, whereupon there was no drawback in the outer appearance, and $\Delta YI$ was 1.6, and accordingly the sample 5 was judged as passed.

EXAMPLE 6

The polymer solution 1 (60 g), UVA1 (1.4 g), UVA2 (1.4 g), n-butyl acetate (15 g) and 2-propanol (30 g) were uniformly mixed to prepare a coating fluid 6. A sample 6 was obtained in the same manner as in Example 1 by using the coating fluid 6. The thickness after drying was 4.9 μm. The sample 6 was subjected to the above weather resistance test, whereupon there was no drawback in the outer appearance, and $\Delta YI$ was 0.3, and accordingly the sample 6 was judged as passed.

EXAMPLE 7

The polymer solution 1 (60 g), UVA 1 (1.4 g), UVA6 (1.4 g), n-butyl acetate (15 g) and 2-propanol (30 g) were uniformly mixed to prepare a coating fluid 7. A sample 7 was obtained in the same manner as in Example 1 by using the coating fluid 7. The thickness after drying was 6.0 μm. The sample 7 was subjected to the above weather resistance test, whereupon there was no drawback in the outer appearance, and $\Delta YI$ was 0.4, and accordingly the sample 7 was judged as passed.

EXAMPLE 8

The polymer solution 1 (60 g), UVA1 (1.4 g), UVA4 (1.4 g), n-butyl acetate (15 g) and 2-propanol (30 g) were uniformly mixed to prepare a coating fluid 8. A sample 8 was obtained in the same manner as in Example 1 by using the coating fluid 8. The thickness after drying was 6.1 μm. The sample 8 was subjected to the above weather resistance test, whereupon there was no drawback in the outer appearance, and $\Delta YI$ was 0.9, and accordingly the sample 8 was judged as passed.

EXAMPLE 9

A polymer solution 2 (a solution having 5 mass % of acrylic polymer (AP-2), 74 mass % of 1-methoxy-2-propanol and 21 mass % of diacetone alcohol mixed) (60 g) and UVA2 (0.3 g) were uniformly mixed to prepare a coating fluid 9. A sample 9 was obtained in the same manner as in Example 1 by using the coating fluid 9. The thickness after drying was 5.0 µm. The sample 9 was subjected to the above weather resistance test, whereupon there was no drawback in the outer appearance, and ΔYI was 2.1, and accordingly the sample 9 was judged as passed.

EXAMPLE 10

The polymer solution 2 (60 g) and UVA2 (0.45 g) were uniformly mixed to prepare a coating fluid 10. A sample 10 was obtained in the same manner as in Example 1 by using the coating fluid 10. The thickness after drying was 5.0 µm. The sample 10 was subjected to the above weather resistance test, whereupon there was no drawback in the outer appearance, and ΔYI was 0.0, and accordingly the sample 10 was judged as passed.

EXAMPLE 11

A polymer solution 3 (a solution having 6 mass % of acrylic polymer (AP-3), 73 mass % of 1-methoxy-2-propanol and 21 mass % of diacetone alcohol mixed) (60 g) and UVA2 (0.54 g) were uniformly mixed to prepare a coating fluid 11. A sample 11 was obtained in the same manner as in Example 1 by using the coating fluid 11. The thickness after drying was 6.3 µm. The sample 11 was subjected to the above weather resistance test, whereupon there was no drawback in the outer appearance, and ΔYI was 0.3, and accordingly the sample 11 was judged as passed.

EXAMPLE 12

A polymer solution 4 (a solution having 20 mass % of acrylic polymer (AP-4), 40 mass % of n-butyl acetate and 40 mass % of 2-propanol mixed) (100 g) and UVA1 (2 g) were uniformly mixed to prepare a coating fluid 12. A sample 12 was obtained in the same manner as in Example 1 by using the coating fluid 12. The thickness after drying was 5.4 µm. The sample 12 was subjected to the above weather resistance test, whereupon there was no drawback in the outer appearance, and ΔYI was 0.5, and accordingly the sample 12 was judged as passed.

COMPARATIVE EXAMPLE 1

A polymer solution 5 (a solution having 15 mass % of acrylic polymer (AP-5), 17 mass % of methyl ethyl ketone, 26 mass % of 2-butanol and 42 mass % of diacetone alcohol mixed) (100 g) and UVA7 (3 g) were uniformly mixed to prepare a coating fluid 13. A sample 13 was obtained in the same manner as in Example 1 by using the coating fluid 13. The thickness after drying was 10 µm. The sample 13 was subjected to the above weather resistance test, whereupon ΔYI was 3.5, but separation of the film occurred, and accordingly the sample was judged as failed.

COMPARATIVE EXAMPLE 2

The polymer solution 1 (60 g), UVA8 (1.8 g), n-butyl acetate (15 g) and 2-propanol (3 g) were uniformly mixed to prepare a coating fluid 14. A sample 14 was obtained in the same manner as in Example 1 by using the coating fluid 14. The thickness after drying was 5.3 µm. The sample 14 was subjected to the above weather resistance test, whereupon ΔYI was 16.0, and cracking occurred on the film, and accordingly the sample 14 was judged as failed.

COMPARATIVE EXAMPLE 3

The polymer solution 1 (60 g), UVA9 (1.8 g), n-butyl acetate (15 g) and 2-propanol (3 g) were uniformly mixed to prepare a coating fluid 15. A sample 15 was obtained in the same manner as in Example 1 by using the coating fluid 15. The thickness after drying was 5.0 µm. The sample 15 was subjected to the above weather resistance test, whereupon ΔYI was 14.9, and cracking occurred on the film, and accordingly the sample 15 was judged as failed.

COMPARATIVE EXAMPLE 4

The polymer solution 1 (60 g), UVA10 (1.8 g), n-butyl acetate (15 g) and 2-propanol (3 g) were uniformly mixed to prepare a coating fluid 16. A sample 16 was obtained in the same manner as in Example 1 by using the coating fluid 16. The thickness after drying was 5.0 µm. The sample 16 was subjected to the above weather resistance test, whereupon there was no drawback in the outer appearance, but ΔYI was 14.0, and accordingly the sample 16 was judged as failed.

COMPARATIVE EXAMPLE 5

A polymer solution 6 (a solution having 15 mass % of acrylic polymer (AP-6), 66 mass % of 1-methoxy-2-propanol and 19 mass % of diacetone alcohol mixed) (60 g) and UVA2 (0.9 g) were uniformly mixed to prepare a coating fluid 17. A sample 17 was obtained in the same manner as in Example 1 by using the coating fluid 17. The thickness after drying was 5.5 µm. The sample 17 was subjected to the above weather resistance test, whereupon ΔYI was 5.9, and white turbidity occurred on the film, and accordingly the sample 17 was regarded as failed.

COMPARATIVE EXAMPLE 6

A polymer solution 7 (a solution having 15 mass % of acrylic polymer (AP-7), 66 mass % of 1-methoxy-2-propanol and 19 mass % of diacetone alcohol mixed) (60 g) and UVA2 (0.9 g) were uniformly mixed to prepare a coating fluid 18. A sample 18 was obtained in the same manner as in Example 1 by using the coating fluid 18. The thickness after drying was 5.0 µm. The sample 18 was subjected to the above weather resistance test, whereupon ΔYI was 13.1, and cracking occurred on the film, and accordingly the sample 18 was regarded as failed.

COMPARATIVE EXAMPLE 7

A polymer solution 8 (a solution having 15 mass % of acrylic polymer (AP-8), 66 mass % of 1-methoxy-2-propanol and 19 mass % of diacetone alcohol mixed) (60 g) and UVA2 (0.9 g) were uniformly mixed to prepare a coating fluid 19. A sample 19 was obtained in the same manner as in Example 1 by using the coating fluid 19. The thickness after drying was 5.2 µm. The sample 19 was subjected to the above weather resistance test, whereupon ΔYI was 14.8, and white turbidity occurred on the film, and accordingly the sample 19 was regarded as failed.

COMPARATIVE EXAMPLE 8

A polymer solution 9 (a solution having 15 mass % of acrylic polymer (AP-9), 66 mass % of 1-methoxy-2-propanol and 19 mass % of diacetone alcohol mixed) (60 g) and UVA2 (0.9 g) were uniformly mixed to prepare a coating fluid 20. A sample 20 was obtained in the same manner as in Example 1 by using the coating fluid 20. The thickness after drying was 6.2 μm. The sample 20 was subjected to the above weather resistance test, whereupon ΔYI was 7.4, and white turbidity occurred on the film, and accordingly the sample 20 was regarded as failed.

COMPARATIVE EXAMPLE 9

A polymer solution 10 (a solution having 20 mass % of acrylic polymer (AP-10), 40 mass % of n-butyl acetate and 40 mass % of 2-propanol mixed) (100 g) and UVA1 (2 g) were uniformly mixed to prepare a coating fluid 21. A sample 21 was obtained in the same manner as in Example 1 by using the coating fluid 21. The thickness after drying was 5.4 μm. The sample 21 was subjected to the above weather resistance test, whereupon ΔYI was 0.8, but skin roughening occurred on the film, and accordingly the sample 21 was regarded as failed.

With respect to the above Examples 1 to 12 and Comparative Example 1 to 9, components constituting the coating layers of the resin substrate samples provided with a coating layer obtained, properties and the blend amounts of the acrylic polymers and the ultraviolet light absorbing components, and the results of the weather resistance test of the resin substrate samples provided with a coating layer are summarized in Table 4.

component of which the physical properties are out of the range of the present invention, undergo discoloration and/or have drawbacks in the outer appearance as the result of the weather resistance test, and they failed the weather resistance test as the overall judgement.

The resin substrate provided with a coating layer of the present invention has sufficient weather resistance, and is useful as a window glass for a vehicle to be attached to an automobile or transportation or a window glass for a building material to be attached to a building construction such as a house or a building.

The entire disclosure of Japanese Patent Application No. 2009-049862 filed on Mar. 3, 2009 including specification, claims, drawings and summary is incorporated herein by reference in its entirety.

What is claimed is:
1. A resin substrate provided with a coating layer, which comprises:
   a substrate made of a resin containing an aromatic ring, and
   a coating layer formed on at least one surface of the substrate, said coating layer having a thickness of from 0.5 μm to 10 μm and comprising:
   (1) an acrylic polymer comprising at least one member selected from the group consisting of an alkyl acrylate and an alkyl methacrylate, as main monomer units, and
   (2) an ultraviolet light absorbing component,

TABLE 4

| | Acrylic polymer | | | | Ultraviolet light absorber | | | 600 hours after weather resistance test | | | |
| --- | --- | --- | --- | --- | --- | --- | --- | --- | --- | --- | --- |
| | | | | | | Absorption | | | | | |
| | Abbreviation | Tg (° C.) | Mw | Acid value | Blend amount (wt %) | Abbreviation | coefficient ε (350-380) ave | Blend amount (wt %) | Thickness (μm) | ΔYI | Outer appearance | Overall judgement |
| Ex. 1 | AP-1 | 105 | 100,000 | At most 1 | 90.9 | UVA1 | 12.4 | 9.1 | 4.8 | 0.3 | ok | ○ |
| Ex. 2 | AP-1 | 105 | 100,000 | At most 1 | 90.9 | UVA2 | 31.0 | 9.1 | 5.4 | 2.0 | ok | ○ |
| Ex. 3 | AP-1 | 105 | 100,000 | At most 1 | 90.9 | UVA3 | 4.1 | 9.1 | 5.7 | 0.9 | ok | ○ |
| Ex. 4 | AP-1 | 105 | 100,000 | At most 1 | 90.9 | UVA4 | 17.2 | 9.1 | 5.3 | 3.2 | ok | ○ |
| Ex. 5 | AP-1 | 105 | 100,000 | At most 1 | 87.0 | UVA5 | 5.5 | 13.0 | 5.7 | 1.6 | ok | ○ |
| Ex. 6 | AP-1 | 105 | 100,000 | At most 1 | 86.5 | UVA1/UVA2 | 12.4/31.0 | 13.5 | 4.9 | 0.3 | ok | ○ |
| Ex. 7 | AP-1 | 105 | 100,000 | At most 1 | 86.5 | UVA1/UVA6 | 12.4/16.3 | 13.5 | 6.0 | 0.4 | ok | ○ |
| Ex. 8 | AP-1 | 105 | 100,000 | At most 1 | 86.5 | UVA1/UVA4 | 12.4/17.2 | 13.5 | 6.1 | 0.9 | ok | ○ |
| Ex. 9 | AP-2 | 105 | 430,000 | 1 | 90.9 | UVA2 | 31.0 | 9.1 | 5.0 | 2.1 | ok | ○ |
| Ex. 10 | AP-2 | 105 | 430,000 | 1 | 87.0 | UVA2 | 31.0 | 13.0 | 5.0 | 0.0 | ok | ○ |
| Ex. 11 | AP-3 | 90 | 550,000 | 0 | 87.0 | UVA2 | 31.0 | 13.0 | 6.3 | 0.3 | ok | ○ |
| Ex. 12 | AP-4 | 105 | 120,000 | 0 | 90.9 | UVA1 | 12.4 | 9.1 | 5.4 | 0.5 | ok | ○ |
| Comp. Ex. 1 | AP-5 | 105 | 87,000 | At most 1 | 83.3 | UVA7 | 3.2 | 16.7 | 10 | 3.5 | Separation | x |
| Comp. Ex. 2 | AP-1 | 105 | 100,000 | At most 1 | 90.9 | UVA8 | 0.7 | 9.1 | 5.3 | 16.0 | Cracking | x |
| Comp. Ex. 3 | AP-1 | 105 | 100,000 | At most 1 | 90.9 | UVA9 | 1.3 | 9.1 | 5.0 | 14.9 | Cracking | x |
| Comp. Ex. 4 | AP-1 | 105 | 100,000 | At most 1 | 90.9 | UVA10 | 0.4 | 9.1 | 5.0 | 14.0 | ok | x |
| Comp. Ex. 5 | AP-6 | 105 | 40,000 | 2 | 90.9 | UVA2 | 31.0 | 9.1 | 5.5 | 5.9 | White turbidity | x |
| Comp. Ex. 6 | AP-7 | 105 | 250,000 | 10.5 | 90.9 | UVA2 | 31.0 | 9.1 | 5.0 | 13.1 | Cracking | x |
| Comp. Ex. 7 | AP-8 | 100 | 85,000 | 3 | 90.9 | UVA2 | 31.0 | 9.1 | 5.2 | 14.8 | White turbidity | x |
| Comp. Ex. 8 | AP-9 | 90 | 85,000 | 0 | 90.9 | UVA2 | 31.0 | 9.1 | 6.2 | 7.4 | White turbidity | x |
| Comp. Ex. 9 | AP-10 | 50 | 160,000 | 0 | 90.9 | UVA1 | 12.4 | 9.1 | 5.4 | 0.8 | Skin roughening | x |

From the results shown in Table 4, it is found that resin substrate samples provided with a coating layer obtained in Examples in which physical properties of the acrylic polymer and the ultraviolet light absorbing component are within the ranges of the present invention, are all passed the weather resistance test as the overall judgement, whereas samples in Comparative Examples in which a coating layer is formed by using an acrylic polymer and/or an ultraviolet light absorbing wherein the acrylic polymer (1) has an acid value of at most 1 mg KOH/g, a glass transition point of from 60° C. to 150° C., and a mass average molecular weight of from 90,000 to 1,000,000, and
wherein the average of absorption coefficients of the ultraviolet light absorbing component (2) to light in a wave length region of from 350 nm to 380 nm is from 3.5 g/(mg·cm) to 100 g/(mg·cm), and said ultraviolet light absorbing component (2) is 2-[4-(4,6-bis-{2-hydroxy-4-[1-(6-methyl-heptyloxycarbonyl)-ethoxy]-phenyl}-[1,3,5]triazin-2-yl)-3-hydroxy-phenoxy]-propionic acid 6-methyl-heptyl ester.

2. The resin substrate provided with a coating layer according to claim 1, wherein the acrylic polymer (1) is a homopolymer or a copolymer comprising an alkyl methacrylate having an alkyl group having at most 6 carbon atoms as the main monomer units.

3. The resin substrate provided with a coating layer according to claim 1, wherein the content of the ultraviolet light absorbing component (2) is from 1 mass % to 30 mass % to the total amount of components constituting the coating layer.

4. The resin substrate provided with a coating layer according to claim 1, wherein the total content of the acrylic polymer (1) and the polymer chain moiety of the ultraviolet light absorbing component (2), excluding ultraviolet light absorbing groups, is from 50 to 97 mass % to the total amount of components constituting the coating layer.

5. The resin substrate provided with a coating layer according to claim 1, wherein the content of the ultraviolet light absorbing component (2) is from 9.1 mass % to 30 mass % to the total amount of components constituting the coating layer.

* * * * *